United States Patent
Alm

(10) Patent No.: US 11,323,647 B2
(45) Date of Patent: May 3, 2022

(54) METHOD OF INJECTING ADDITIONAL DATA

(71) Applicant: Axis AB, Lund (SE)

(72) Inventor: Carl-Axel Alm, Lund (SE)

(73) Assignee: AXIS AB, Lund (SE)

( * ) Notice: Subject to any disclaimer, the term of this patent is extended or adjusted under 35 U.S.C. 154(b) by 0 days.

(21) Appl. No.: 17/070,939

(22) Filed: Oct. 15, 2020

(65) Prior Publication Data
US 2021/0195133 A1  Jun. 24, 2021

(30) Foreign Application Priority Data

Dec. 18, 2019  (EP) .................................... 19217338

(51) Int. Cl.
*H04N 5/3745* (2011.01)
*H04N 5/378* (2011.01)
*G06V 20/40* (2022.01)

(52) U.S. Cl.
CPC ......... *H04N 5/37457* (2013.01); *G06V 20/40* (2022.01); *H04N 5/378* (2013.01)

(58) Field of Classification Search
CPC ...... H04N 5/37457; H04N 5/378; H04N 7/08; H04N 7/083; G06K 9/00711
See application file for complete search history.

(56) References Cited

U.S. PATENT DOCUMENTS

| | | | | |
|---|---|---|---|---|
| 5,956,090 A | * | 9/1999 | Yamauchi | H04N 7/088 348/441 |
| 6,064,440 A | * | 5/2000 | Born | H04N 7/088 348/461 |
| 6,466,275 B1 | * | 10/2002 | Honey | H04N 5/222 348/157 |
| 8,050,206 B2 | | 11/2011 | Siann et al. | |
| 9,432,708 B1 | * | 8/2016 | Feldman | H04N 21/44008 |
| 2005/0125845 A1 | * | 6/2005 | Hardt | H04N 7/088 725/137 |
| 2020/0213074 A1 | * | 7/2020 | Shimomura | G06F 1/08 |
| 2021/0360151 A1 | * | 11/2021 | Mizuno | H04L 7/0008 |

FOREIGN PATENT DOCUMENTS

| | | |
|---|---|---|
| EP | 2712205 A2 | 3/2014 |
| EP | 2712205 A3 | 6/2014 |

OTHER PUBLICATIONS

Extended European search report received for European Patent Application No. 19217338.3, dated Jul. 2, 2020, 5 pages.
Micron, "½—inch Megapixel CMOS digital image sensor", pp. 1-35.

* cited by examiner

*Primary Examiner* — Nhan T Tran
(74) *Attorney, Agent, or Firm* — Xsensus LLP

(57) ABSTRACT

The present invention discloses a method of injecting additional data in one or more image sensor frames in an image sensor device. The method comprises: providing (801) additional data in the form of a numeric sequence, controlling (802) the lengths of subsequent blanking intervals in one or more image sensor frames to represent the numeric sequence, and transmitting the one or more image sensor frames from the image sensor device. The one or more image sensor frames may be transmitted to an image processor (12, 72). Examples of image processors (12, 72) and a system (1, 7) comprising an image processor (12, 72) are also disclosed.

15 Claims, 4 Drawing Sheets

METHOD OF INJECTING ADDITIONAL DATA

CROSS-REFERENCE TO RELATED APPLICATION

The present application claims priority to EP 19217338.3, filed Dec. 18, 2019, the entire contents of which are incorporated herein by reference.

TECHNICAL FIELD

The present invention relates to the field of adding additional data to image sensor data.

BACKGROUND

Image sensor devices are basic components in the field of imaging. An image sensor device comprises a hardware component, i.e. an image sensor, and a processing component that converts readout from the image sensor into signals representing image sensor data. The readouts from the image sensor data are called image sensor frames, wherein one image sensor frame represents one readout cycle of the image sensor. Well-known examples of electronic image sensors include CCD and CMOS sensors.

There exists a wide variation of image sensor hardware, including common standard sensors and specially designed sensors, often adapted to particular technical fields. For example, there exists sensor hardware with extra sensor rows or columns which the image sensor device may use for adding data regarding image characteristics. A problem with such non-standard sensors are that they can be extra costly, and that adaption of an image processor, that receives the image sensor frames for processing, needs to be modified in order to correctly interpret the received data.

Imaging, in general, is a widely used tool in many fields, for example surveillance/monitoring, medical examinations, and construction. In many applications, it is important to be able to trust the image sensor data. For example, that a supposedly live view of a video is in fact live and not delayed, or that images are recorded by a presumed image sensor and have not been exchanged or come from another image sensor. For this purpose, verification of the images is useful. It becomes increasingly important to think about this aspect when methods of tampering with image sensor data are increasingly common. Moreover, as image quality increases the processing time of image sensor data may also increase with a higher delay risk. Evidently, there is a need for methods and devices for aiding verification of image sensor data.

SUMMARY OF THE INVENTION

An aim of the present invention is to provide a method for use in verification of image sensor data. The purpose of the verification may be to validate a live view or to validate the authenticity of an image or a video.

According to a first aspect, these and other objects are achieved, in full or at least in part, by a method of injecting additional data in one or more image sensor frames in an image sensor device, the method comprising:
  providing additional data in the form of a numeric sequence, and
  controlling the lengths of subsequent blanking intervals in one or more image sensor frames in an image sensor device to represent the numeric sequence, and
  transmitting the one or more image sensor frames from the image sensor device.

The invention is thus a method for associating additional data with image sensor data by injecting the additional data in the corresponding one or more image sensor frames at an early stage, meaning already before the transmission of the one or more image sensor frames from the image sensor device. The injection is realized by controlling the lengths of subsequent blanking intervals in the one or more image sensor frames that includes the active image sensor data. By active image sensor data is meant data corresponding to pixel values read from an image sensor, and which correspond to an amount of light that is received from a scene. Each image sensor frame may also include, for example, margin pixel values, sync data, frame header, frame footer, etc. The image sensor is located in an image sensor device that comprises necessary circuits for reading and transmitting image sensor data.

The controlling of the lengths is performed according to a predetermined communication protocol that defines a message, i.e. the meaning of a sequence of length variations of the subsequent blanking intervals. The exact form of the communication protocol is not essential for the invention, and it is well-known for the skilled person how to design a functioning protocol.

Thus, the invention utilizes standardized techniques to enable the injection. No specially designed sensor hardware is required. Moreover, the active image sensor data are not modified or extended for the purpose of enabling the injection of additional data. Thus, the active image sensor data can be interpreted by a processing or storage device (such as an image processor) in a standard manner, i.e. without special design or adaption regarding how to interpret the active image sensor data. The adaption of the processing or storage device that is required to be able to receive the numeric sequence is a process that does not affect the receiving of the active image sensor data. Instead, the numeric sequence may be received by determining the lengths of the subsequent blanking intervals when receiving the one or more image sensor frames. The lengths may be determined by counting the number of clock cycles of each subsequent blanking interval, wherein the number of clock cycles corresponds to the length of the blanking interval. Other ways to determine the lengths of the subsequent blanking interval may be possible.

With the knowledge of the communication protocol (i.e. how the numeric sequence is shaped and represented in the lengths of subsequent blanking intervals), the processing or storage device can receive and understand the numeric sequence. The communication protocol may be known by both the image sensor device and the processing or storage device.

Blanking intervals is a well-known term within the technical field of image sensors. A blanking interval is delay period occurring after a period of transmission of active image sensor data and before beginning image sensor readout of a next row or of a next image sensor frame. The invention may comprise controlling the lengths of subsequent horizontal blanking intervals, or subsequent vertical blanking intervals. By subsequent blanking intervals are meant single or groups of blanking intervals that are transmitted from the image sensor device after each other. The subsequent blanking intervals do not need to be located adjacently in the one or more image sensor frames. However, the subsequent blanking intervals may be length-controlled in the same order as the numerical sequence, i.e. a first subsequent interval has a length that corresponds to the first value in the numerical sequence, a second subsequent interval has a length that corresponds to the second value in the numerical sequence, and so on.

The subsequent blanking intervals may be located within a single image sensor frame. In such an embodiment, it is preferred that the controlling of the lengths is made on subsequent horizontal blanking intervals. Alternatively, the subsequent blanking intervals may be located in a plurality of (i.e. more than one) image sensor frames. In such an embodiment, the subsequent blanking intervals may be varied between different image sensor frames, i.e. a first group of subsequent blanking intervals in a first image sensor frame have a same first length, a second group of subsequent blanking intervals in a second image sensor frame have a same second length, and so on. In other words, for each image sensor frame the blanking interval length may be varied in accordance with the numeric sequence. By receiving a sequence of image sensor frames, the variation in blanking interval lengths, and thus the numeric sequence, can be received as well. This is a preferred embodiment when controlling of the length is made on subsequent vertical blanking intervals.

As will be disclosed in detail, the step of controlling the lengths of blanking intervals can be done in various ways. For example, the lengths may be controlled by controlling the timing of a signal for horizontal synchronization or vertical synchronization.

According to one embodiment, the one or more image sensor frames are received by a processing or storage device, which can be an image processor. The additional data are derived by determining the lengths of the subsequent blanking intervals to identify the numeric sequence. The lengths are determined, for example by counting how many clock cycles that the delay period between the last image sensor data of a row, for example, and the first image sensor data of the next row. In some protocols for transmitting image sensor frames, the blanking intervals are recognizable by, for example, being represented in a data stream in a predefined manner.

The image processor, or other processing or storage device, may be located in the same device as the image sensor device. Thus, by transmitting the one or more image sensor data may be meant to transmit within the same device, for example between different hardware and/or software circuitry handling different functions of the common device. The common device may be an optics unit of a camera which comprises both an image sensor with image sensor circuitry (i.e. image sensor board) and an image processing chip, wherein image frames are transmitted from the image sensor board to the image processing chip.

It has been realized that it is beneficial to include or embed the additional data in active image sensor data of the received one or more image sensor frames. The additional data may be included in the active image sensor data of all or a selection of the one or more image sensor frames.

By including the additional data in the active image sensor data, the additional data will have a stronger association with and follow its associated active image sensor data when being transmitted onwards. For these purposes, the method may further comprise:

receiving the transmitted one or more image sensor frames while determining the length (i.e. number of clock cycles) of the subsequent blanking intervals to identify the numeric sequence which represents the additional data, modifying active image sensor data in the received one or more image sensor frames to include the additional data.

As disclosed, the processing or storage device may possess the knowledge of a communication protocol defining how the additional data are inserted, i.e. which blanking intervals of the one or more image sensor frames that are length-controlled, so that the additional data can be read. In an embodiment where the processing or storage device performs the control of the lengths, it is sufficient that the processing or storage device, and not the image sensor device, has the knowledge of this protocol. Alternatively, another device (e.g., the image sensor device) may control the length. In such an embodiment, the communication protocol is shared with the processing or storage device.

Before modifying the active image sensor data, the numeric sequence may be transformed to a format that is associated with the type of additional data. For example, if the additional data form a time stamp, the numeric sequence is transformed to a time format, such as [hours:minutes:seconds]. If the additional data form text, the numeric sequence is transformed to a text format. For this purpose, an embodiment of the method may comprise a step of: before modifying active image sensor data, transforming the numeric sequence to a format associated with the type of additional data.

The additional data, in any representation, may be included as an overlay or as an embedded signal in the active image sensor data. For example, additional data in the form of text or a time stamp may be included as an overlay of letters/numbers. An overlay is preferably visible for a user when displayed. An embedded signal, however, may be preferably more or less hidden in the displayed active image sensor data. An embedded signal may be achieved by varying pixel values in a part of the active image sensor data according in a predetermined manner. The embedded signal may be interpreted by an evaluation device that receives the active image sensor data directly or indirectly from the processing or storage device.

Alternatively, the additional data may be included as metadata (for example, in a header of a JPEG image file) of the active image sensor data and transmitted to, for example, an evaluating device such as a display device.

With regards to the additional data, these may indicate a current condition for the point in time when the one or more image sensor frames are acquired. For example, a time, a date, a position of the image sensor device, or image sensor characteristics (including a unique image sensor fingerprint or software/hardware version of the image sensor). The current condition may change frequently, like time and position, be static or be rarely changing, like software version (rarely changing), image sensor serial number (static), and image sensor characteristics (static or rarely changing).

The additional data may be provided in the processing or storage device, being for example an image processor. In such an embodiment, the lengths of subsequent blanking intervals are controlled by the processing or storage device. An advantage in this embodiment is that no modifications of the image sensor device are required, and that the above discussed communication protocol does not need to be shared outside the processing or storage device. Each of these advantages contributes to a low-complex and easily implemented solution.

In a specific embodiment, where an image processor may act as the processing or storage device, the subsequent blanking intervals may be controlled via, for example, a control signal, a horizontal sync signal, or a vertical sync signal. These signals are known and implemented in various standard implementations of image sensor device control by an image processor.

In an alternative embodiment, the additional data are provided in the image sensor device, and the lengths of subsequent blanking intervals are controlled by the image sensor device.

Regardless of in which device the additional data are provided, the additional data may be delivered by, or fetched from, a global or local system clock, or a GNSS device (such as a GPS device).

With regards to the numeric sequence, this can be provided as a binary sequence. An advantage of this embodiment is that the lengths of the subsequent blanking intervals are not varied more than one length unit, that is one clock cycle, relative each other. This allows for minimal impact on the lengths of the blanking intervals, and minimizes the impact of the total amount of clock cycles that a transmission of a complete image sensor frame takes. It may be preferred that transmissions of image sensor frames take the same number of clock cycles. Thus, it is beneficial to reduce the size of the length variations in blanking intervals by the present method.

For the purpose of providing a constant number of required clock cycles per each transmission of an image sensor frame, the method may further comprise modifying lengths of one or more blanking intervals, other than the subsequent blanking intervals, for compensation. In other words, some blanking intervals (that are not modified for the purpose of injecting additional information) are modified for the purpose of compensation. The compensation blanking intervals are preferably located between the subsequent blanking intervals (modified for the purpose of injecting additional information) and are preferably adapted to gradually compensate for the variation in the subsequent blanking intervals.

According to a second aspect of the invention, there is provided an image processor adapted to inject additional data, provided in the form of a numeric sequence, in one or more image sensor frames by controlling the lengths of subsequent blanking intervals in one or more image sensor frames to represent the numeric sequence. The image processor of the second aspect may generally be embodied in the same ways as the method of the first aspect with accompanying advantages. For example, the image processor may be further adapted to receive, from the image sensor device, the one or more image sensor frames while determining the length of the subsequent blanking intervals to identify the numeric sequence which represents the additional data, modify the received active image sensor data to include the additional data, and modify active image sensor data in the received one or more image sensor frames to include the additional data.

According to a third aspect of the invention, there is provided a system comprising an image sensor device and an image processor, wherein the image processor is configured according to the second aspect. The image sensor device and the image processor may be parts of a single device (for example a camera device) or be parts of separate, communicatively coupled, devices.

The system may further comprise an evaluating device, for example in the form of a display device. The image processor may be adapted to transmit the (modified) active image sensor data of the one or more image sensor frames to the evaluating device, wherein the included additional data are in the form of a time or a position at the time for when the one or more image sensor frames were acquired. The evaluating device may be adapted to determine if the time or the position of the additional data differs from a current time or current position more than a predetermined threshold, and, if so, be adapted to trigger an alarm action to indicate to a user that the received active image frame data are old, i.e. older than a predetermined age (for example 1 second). This is a specific system configuration that is suitable for increasing security when making safety critical decisions based on images or video captured by the image sensor device (for example a camera device). Non-limiting examples of such systems include bus door control, vehicle cameras (in particular rear cameras), and medical examinations.

The step of triggering an alarm action may comprise triggering one or more of the following actions: refraining from or cancelling display of the received modified active image sensor data on a display, displaying the modified active image sensor data in a flashing manner on a display, displaying an indication on a display, activating an illuminator, and playing a sound by a speaker. The display, illuminator, and/or speaker may be part of the evaluating device.

A further scope of applicability of the present invention will become apparent from the detailed description given below. However, it should be understood that the detailed description and specific examples, while indicating preferred embodiments of the invention, are given by way of illustration only, since various changes and modifications within the scope of the invention will become apparent to those skilled in the art from this detailed description.

Hence, it is to be understood that this invention is not limited to the particular component parts of the device described or steps of the methods described as such device and method may vary. It is also to be understood that the terminology used herein is for purpose of describing particular embodiments only, and is not intended to be limiting. It must be noted that, as used in the specification and the appended claim, the articles "a", "an", "the", and "said" are intended to mean that there are one or more of the elements unless the context clearly dictates otherwise. Thus, for example, a reference to "an object" or "the object" may include several objects, and the like. Furthermore, the word "comprising" does not exclude other elements or steps.

BRIEF DESCRIPTION OF THE DRAWINGS

The invention will now be described in more detail by way of example and with reference to the accompanying schematic drawings, in which.

As illustrated in the figures, the sizes of regions may be exaggerated for illustrative purposes and, thus, are provided to illustrate general structures.

DETAILED DESCRIPTION OF EMBODIMENTS

Figure 1:
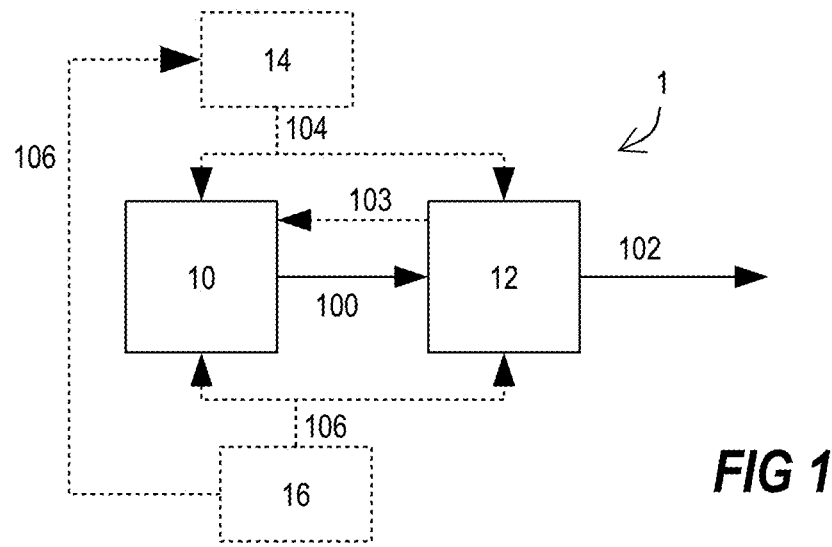
FIG. 1 is an overview of a system with an image sensor device and an image processor.
Figure 8:
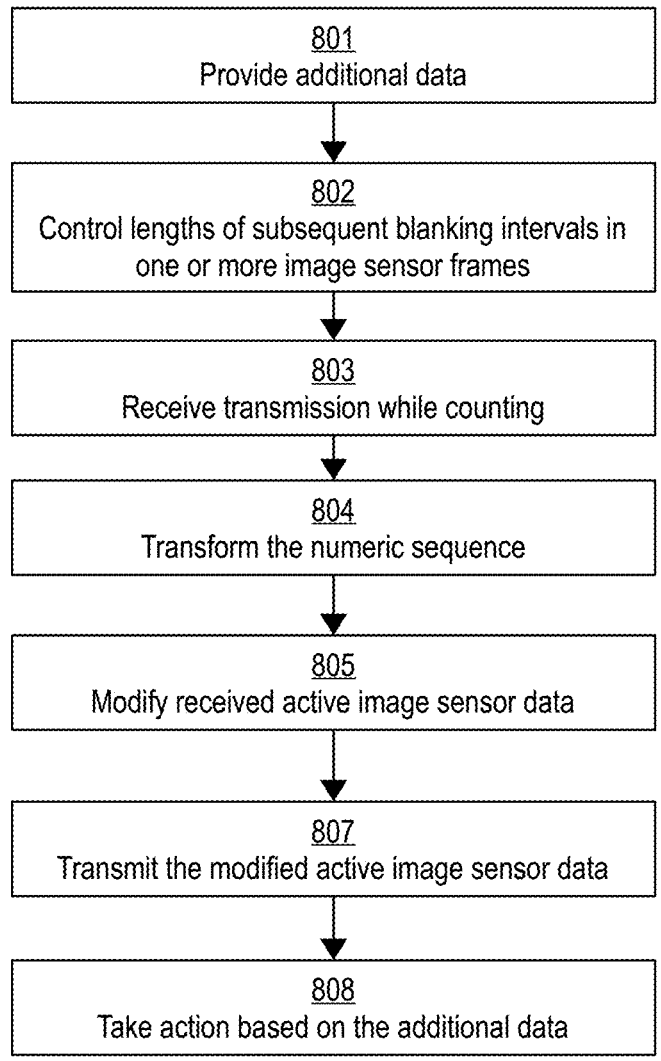
FIG. 8 illustrates a method according to an embodiment of the invention.

An overview of the general concept of the invention will now be disclosed with reference to FIG. 1 and FIG. 8.

FIG. 1 illustrates a part of an image capturing system 1 including an image sensor device 10, an image processor 12, an optional controller 14, and an optional external data provider 16. FIG. 8 illustrates a method 8 of injecting additional data in one or more image sensor frames in an image sensor device, e.g., the image sensor device 10.

The present invention is based on the realization that it may be beneficial to add additional data to one or a group of image sensor frames at an early stage, and that the additional data may be injected by modifying blanking intervals of the one or more image sensor frames. How this can be done will now be disclosed.

First, additional data are provided 801. The additional data are in the form of a numeric sequence. This step (801) may be preceded by steps of providing additional data in an original format, e.g. a time format or a date format, and transforming the additional data from its original format to the numeric sequence. These preceding steps may be performed by any suitable part of the system 1. The additional data are provided 801 in the image sensor 10, the image processor 12, or in the controller 14. More specifically, the additional data are provided 801 in the part of the image capturing system 1 that is to control the injection of the additional data in the one or more image sensor frames. The controlling may be performed by the image sensor 10, the image processor 12, or by an external device represented here by the controller 14.

Parallel to the provision 801 of additional data, and in accordance with normal operation of the image sensor device 10, active image sensor data are captured by means of an image sensor in the image sensor device 10. The image sensor is of conventional structure and function. Thus, the image sensor transforms received light from a field of view to electrical signals that forms the active image sensor data. An image sensor has typically a rectangular shape with a number of rows and columns defining its size. A main part of the image sensor may be configured to generate active image sensor data, and the image sensor may also include one or more margin areas that is used for other purposes than depicting the scene in the field of view.

Figure 2:
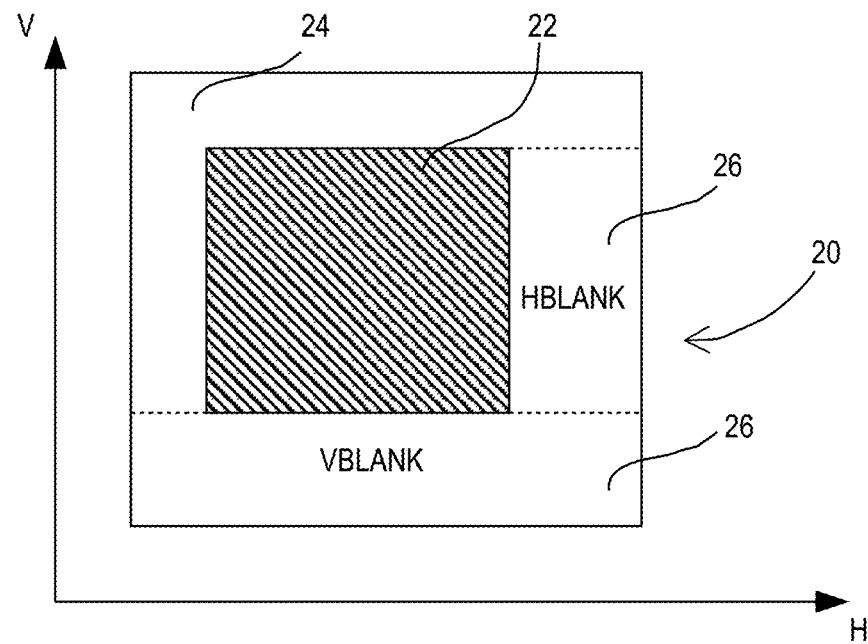
FIG. 2 illustrates an image sensor frame.

FIG. 2 illustrates an example of an image sensor frame 20 presented in a coordinate system of horizontal (H) and vertical (V) axes. The image sensor frame 20 is formed of a number of horizontal rows and vertical columns. The image sensor frame 20 comprises a main area 22 with active image sensor data and a margin area 24. The main area 22 comprises pixel values that will later form a visual part of the corresponding image frame, and may have a size of (for example) H1920×V1080. The margin area 24 comprises pixel values that may be used for color compensation, light analysis, image stabilization, etc. The image sensor frame 20 also comprise a blanking area 26 comprising areas of horizontal and vertical blanking intervals (HBLANK and VBLANK, respectively). The image sensor frame 20 of this general example follows conventional structure of an image sensor frame 20. It is noted that other conventional forms of image sensor frames are possible. For example, the margin area 24 may have a different size and/or comprise other information than the examples provided above.

Returning to FIG. 1, the image sensor frame 20, being a product of a readout of the image sensor, is transmitted from the image sensor device 10 to the image processor 12, as indicated by 100. The general concept of the invention is to include the additional data in the image sensor frame 20 when reading the image sensor before transmitting the image sensor frame 20. This is done by injecting a representation of the additional data in the image sensor frame 20, which will be disclosed in more detail later. By associating the additional data with the active image sensor data (of the main area 22) at such an early stage, a powerful tool for assisting verification and authenticity check of the image sensor data, in particular of the active image sensor data, is provided. Different types of additional data may be injected depending on purpose, which will be exemplified herein.

Figure 3:
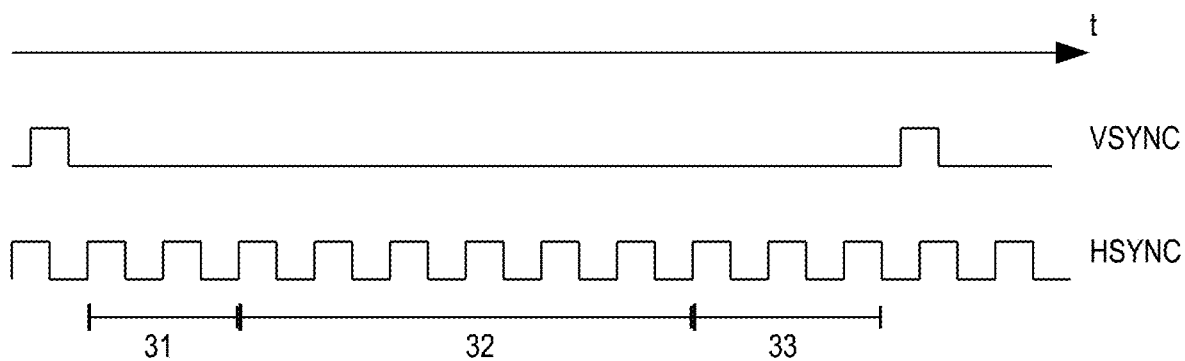
FIGS. 3-5 illustrate how an image sensor frame may be transmitted.
Figure 4:
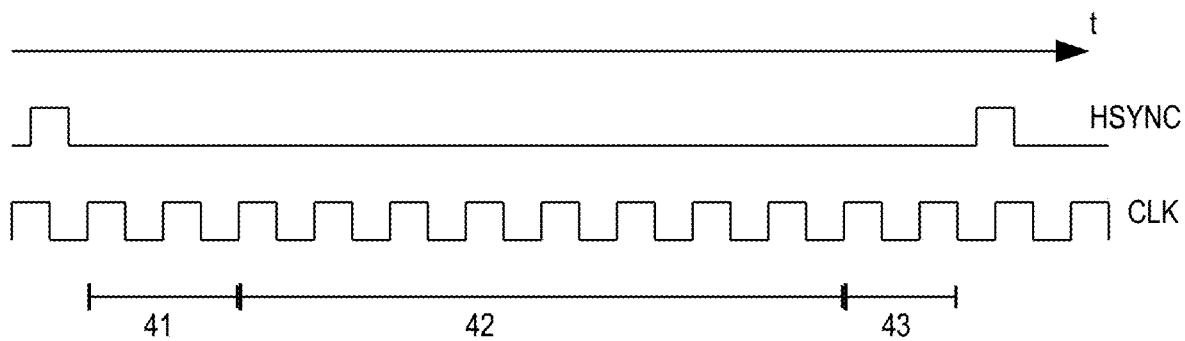
Figure 5:
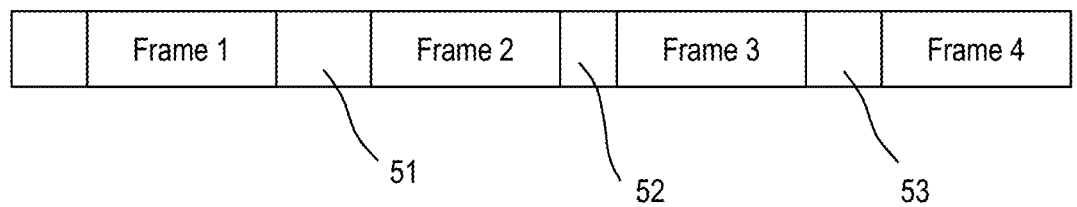

Going more into details of the forming of the image sensor frame 20, this part will be disclosed with further reference to FIGS. 3-5. The forming of the image sensor frame 20 is performed by reading the image sensor of the image sensor device 10.

FIG. 3 illustrates a cycle for a complete readout from the image sensor, i.e. for reading the complete image sensor frame 20. In accordance with conventional structures of an image sensor device, pixel values are read (horizontal) row by row and transmitted, together with data concerning, e.g., image sensor characteristics, light data, etc., to the image processor 12. The transmission is signal controlled. A first signal VSYNC controls the vertical readout and triggers the readout cycles. A second signal HSYNC controls the readout of the rows within a vertical readout cycle. Each HSYNC signal triggers readout of a next row. Thus, as illustrated in FIG. 3, a plurality of HSYNC cycles are present during one VSYNC cycle. During a first portion 31 of HSYNC cycles, frame level data (such as light or color characteristics) may be read and transmitted. During a second portion 32 of HSYNC cycles, image sensor data in the form of active sensor pixel values are read and transmitted. A final portion 33 of HSYNC cycles forms a vertical blanking interval, also known as vertical blank or VBLANK. The vertical blanking interval forms a delay period of time between the final line of a frame (i.e. final value of data output from the image sensor device 10) and the beginning of the first line of the next image sensor frame.

FIG. 4 illustrates what is transmitted in a single HSYNC cycle, for example during one of the HSYNC cycles of the second period 32. A HSYNC cycle lasts for a number of clock (CLK) cycles. The length of the CLK cycles is defined by a pixel clock of the image sensor device 10, in accordance with conventional configurations. During a first period 41 of CLK cycles, synchronization and/or dummy data are read and transmitted. During a second period 42 of CLK cycles, active pixel values of a single row of the image sensor are read and transmitted. The readout is controlled by registers in the image sensor device 10 that indicates how many image sensor pixels that should be read for each row, and how many rows that should be read for each image sensor frame. Registers may be implemented and used in a conventional manner.

A last period 43 of CLK cycles of each HSYNC cycle forms a horizontal blanking interval, also known as horizontal blank or HBLANK, which has a similar function to the vertical blanking interval described above. The horizontal blanking interval is formed between the readout of the last image sensor pixel of one row and the first image sensor pixel of the next row. The last and first image sensor pixels may be active or non-active. The beginning of a next row may be indicated by a signal indicating the beginning of the next HSYNC cycle.

FIG. 5 illustrates, on a higher level, the readout and transmission of a plurality of image sensor frames the image sensor device 10 to the image processor 12. Image sensor frames 1, 2, 3, and 4 are indicated. Between the frames, vertical blanking intervals 51, 52, 53 are present.

Now, when having disclosed the structure of the readout of image sensor frames, the details of the injection of additional data in the image sensor frames will now be disclosed. As illustrated in FIG. 8, a next step of the method is to control 802 lengths of subsequent blanking intervals one or more image sensor frames to represent the numeric sequence, which in turn represents the additional data. The blanking intervals that are referred to can be vertical blanking intervals 33 or horizontal blanking intervals 43, forming different embodiments of the invention.

Going more into the details of the embodiment where the lengths of subsequent horizontal blanking intervals are controlled, this is an embodiment where the numeric sequence may be transmitted during one VSYNC cycle, that is during the transmission of a single frame. The control may be performed by the image sensor device 10 itself, by the image processor 12 (through conventional HSYNC control signal, or other control signal as indicated by 103 in FIG. 1), or by the external controller 14. By controlling the length of subsequent horizontal blanking intervals is meant that each last period 43 of CLK cycles in predetermined subsequent HSYNC cycles is controlled to have a specific length, i.e. a specific number of CLK cycles. By subsequent HSYNC cycles are meant cycles that come after each other, but not necessarily adjacently. For example, the horizontal blanking interval may be, within a single VSYNC cycle, be controlled for HSYNC cycle number 5, 10, 15, 20, and so on, that is every $5^{th}$ row. The number of intermediate rows between the subsequent blanking intervals does not need to be the same. For example, the horizontal blanking interval may be, within a single VSYNC cycle, controlled for HSYNC cycle number 47, 48, 105, 328, 350, etc. Which horizontal blanking intervals that are to be controlled is defined, i.e. predetermined, by the communication protocol, which configuration and purpose have been discussed above. It is understood that a sequence of subsequent blanking intervals that are controlled may extend over a plurality of image sensor frames, according to the same principles as for a single image sensor frame.

The horizontal blanking intervals are controlled to represent the numeric sequence. For example, with a numeric sequence in the form of a binary sequence [111110011101000100001010], subsequent horizontal blanking intervals may be length controlled to represent the numeric sequence by adding the number of CLK cycles according to the numeric sequence. In other words, for the five first subsequent horizontal blanking interval, add one extra CLK cycle, for the next two, add no extra CLK cycles, and so on. Thus, the numeric sequence is injected into the image sensor frame by modifying the length of the subsequent horizontal blanking intervals, in this exemplifying embodiment within a single image sensor frame.

The length-control of subsequent blanking intervals may be performed as a variation of the blanking interval length relative a base value. For example, with a base value of 10 clock cycles, a numeric sequence of [1100] may be injected by controlling the first and second subsequent blanking intervals to each have +1 clock cycles, i.e. 10+1=11 clock cycles, and the third and fourth subsequent blanking intervals to each have +0 clock cycles, i.e. 10+0=10 clock cycles. The base value may in one embodiment be 0. The base value may in other embodiments vary between blanking intervals, possibly due to other length-varying mechanisms. The skilled person possesses the knowledge on how to handle such circumstances when implementing the inventive concept.

One way to implement the controlling of subsequent horizontal blanking intervals is to control when the HSYNC signal is sent to the image sensor device 10, and thus indicating a beginning of readout of the next row. By delaying the HSYNC cycle, the delay period that constitutes the horizontal blanking interval 43 is extended. Hence, the timing of the HSYNC signal, i.e. the timing of the indicator to begin readout of a next row, is controlled so as to control the length of the horizontal blanking interval.

Moving to the other embodiment where subsequent vertical blanking intervals 33 are length-controlled, this is an embodiment where the numeric sequence is injected in, preferably, a plurality of image sensor frames. For each frame, the vertical blanking intervals 33 therein are controlled to have a specific length such that subsequent blanking intervals over a portion of transmitted image sensor frames corresponds to the numeric sequence. In FIG. 5, it can be noted that the vertical blanking intervals 51, 52, 53 have different lengths in accordance with this embodiment.

The vertical blanking interval may be controlled in the same manner as for the horizontal blanking interval, i.e. by controlling the timing of a VSYNC signal which triggers the beginning of readout of a next image sensor frame.

The control of horizontal blanking intervals and vertical blanking intervals may be utilized simultaneously, that is within a single embodiment. Some rapidly changing additional data (for example time stamps) may be beneficial to transmit faster, for which length-control of horizontal blanking intervals are suitable, while other more slowly changing or static additional data may be sufficient to inject by length-control of vertical blanking intervals. For example, a time stamp, which the numeric (binary) sequence above exemplifies can be injected by length-controlling the horizontal blanking intervals, while a date stamp, being represented by a numeric sequence of for example Ser. No. 18/122,020 (18 Dec. 2020), may be injected by length-controlling the vertical blanking intervals.

In one embodiment, the method further comprises to length-control blanking intervals, called compensation blanking intervals herein, other than the subsequent blanking intervals that are length-controlled for the purpose of transmitting the additional data. The compensation blanking intervals are length-control in order to compensate for the difference in total clock cycles between different image sensor frames, in other words how many clock cycles it takes to transmit different frames. It is beneficial to keep the total number of clock cycles per image sensor frame constant, or at least to strive towards a minimal variation of the total number of clock cycles per image sensor frame. For this purpose, the length-controlling of the compensation blanking intervals are introduced. The compensation blanking interval may be located after a sequence of subsequent blanking intervals, and be length-controlled to compensate for the total modification of that sequence. In one embodiment, the compensation blanking interval is located after all subsequent blanking intervals in an image sensor frame and is length-controlled to compensate for the accumulated change in clock cycles that all subsequent blanking intervals in that image sensor frame cause. In an alternative embodiment, a plurality of compensation blanking intervals are implemented. Preferably, they are located between the subsequent blanking intervals and are adapted to gradually compensate for the variation in the subsequent blanking intervals. In other words, each subsequent blanking interval is followed by a compensation blanking interval that is length-controlled to compensate for the change in length of that subsequent blanking interval. With this embodiment, a gradual compensation is achieved which maintains the number of clock cycles per frame segment of an image sensor frame on a substantially constant level between different image sensor frames.

Moving forward, the next step of the method 8 is receiving 803 the transmission of the image sensor frame 20. The transmission (100 in FIG. 1) may be performed in accordance with conventional transmission protocols, for example a MIPI protocol. In order to receive the additional data, the image processor 12 determined the lengths of the subsequent blanking intervals, which is known by the communication protocol discussed above. The determination is performed by counting the number of clock signals in each of the subsequent blanking intervals while receiving and storing image sensor data of the image sensor frame 20 for processing. Other conventional ways of determining the lengths of the subsequent blanking intervals may be applied.

The determined lengths, i.e. the numeric sequence, may be stored in a dedicated processor memory. Thus, the numeric sequence has been transmitted to and actively received by the image processing device 12.

Next, the image processing device 12 may transform 804 the numeric sequence into a format of the additional data, for example a text or numeric representation. The format may be known on beforehand, for example by being predefined in the communication protocol.

Next, the image processing device 12 processes, according to a normal operation of conventional image processing devices, the active image sensor data, and possibly other received data. The processing may further comprise modifying 805 the active image sensor data to include the additional data. The additional data may be represented by the numeric sequence in its original or transformed format. The additional data thus become an integral part of the active image sensor data. The additional data may be included in various known ways, which will be exemplified in the following with reference to FIG. 6.

In a first example, the additional data are included as an overlay 63 to an image 62 that is formed by active image sensor data. The overlay 63 is in this example a text field showing a date stamp and a time stamp for when the corresponding active image sensor data were acquired. The image 62 may be displayed for a user who can read and use the information provided in the overlay 63 for verification of the active image sensor data or for other purposes.

Figure 6:
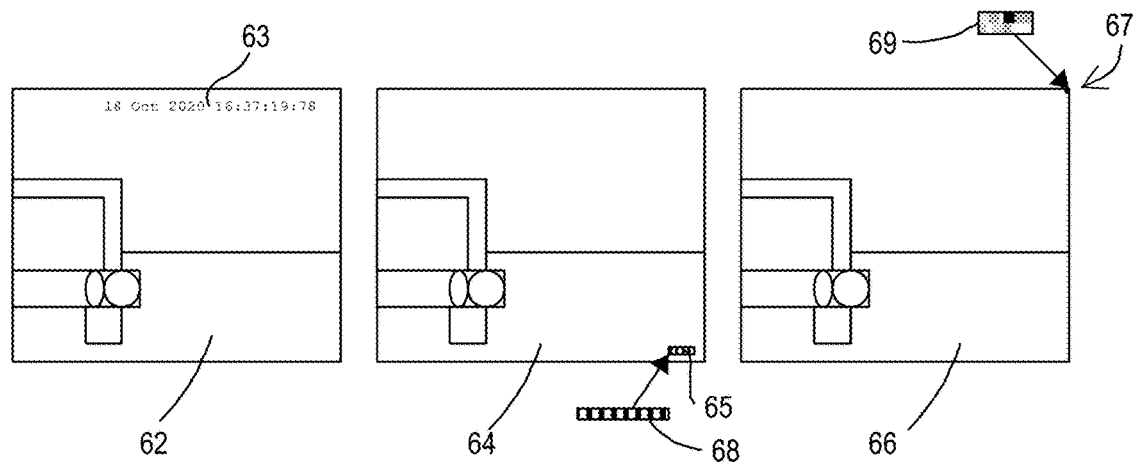
FIG. 6 illustrates active image sensor data with included additional data according to different embodiments.

In a second example, the additional data are included as a binary code indicator 65. The additional data are transformed into a binary format and pixel values 68 in the active image sensor data are modified to represent the binary additional data. The pixel values 68 may for example be modified to represent the additional data in the binary format as black pixels (each representing a binary 0) and white pixel (each representing a binary 1). The modified pixel values 68 form the binary code indicator 65. The binary code indicator 65 may take up an area of, for example, 25 pixels of a single row. It should be noted that the size of the binary code indicator 65 in FIG. 6 is exaggerated for illustrative purposes. The additional data are thus inserted into an image 64, formed by active image sensor data, in an embedded manner and may be made very discrete and even unnoticeable by a human eye.

A third example of how to include the additional data are illustrated by intensity shifted pixels 69 of an image 66. In an indicator area 67 of the image 66, intensity values of pixels (e.g., intensity shifts of greyscale intensities or of RGB values) are shifted to form a code or visual representation of the additional data.

In other embodiments, the additional data may be included as metadata (for example, in a header of a JPEG image file) of the active image sensor data.

How to form an overlay, to modify pixel values, to form an indicator area, and add additional data as metadata or similar data, are, as such, known and may be implemented by a skilled person. Further details of the inclusion of additional data will thus not be provided.

Returning to FIG. 8, the next step is to transmit 807 the modified active image sensor data to another device, as indicated by 102 in FIG. 1. The modified active image sensor data may be in an encoded or a not encoded format. The modified image sensor data may be accompanied by other data, such as image data resulting from image processing. Thus, the image processor 12 may have encoding capabilities for encoding the modified active image sensor data before further transmittal. Alternatively, the modified active image sensor data may be transmitted from the image processor 12 to an encoder (not illustrated) for encoding.

Eventually, the encoded modified active image sensor data are transmitted 807 to an evaluating device, in this embodiment in the form of a display device, possibly together with other data. The evaluating device may comprise a decoder and other processors for decoding the modified active image sensor data and display it for a user. Depending on application, the evaluating device may be configured differently.

Alternatively, the encoded modified active image sensor data may be stored in a memory to provide the possibility for view of inspect later. The inspection may be performed by an evaluating device.

Regardless of how the modified active image sensor data are handled after the image processor 12, the additional data are in the illustrated embodiment included in the modified active image sensor data and thus the active image sensor data and the additional data follow each other if not actively separated. Any potential translation, stitching, correction, or other processing of the active image sensor data may be performed without losing the information of the additional data therein.

Returning to the embodiment where the modified active image sensor data are transmitted 807 to an evaluating device in the form of a display device, a next step may be that the display device performs an analysis with the additional data as input, and takes appropriate action based on the result of the analysis. For example, the analysis may be a verification of the active image sensor data to verify that the data are not too old, due to for example transmission delay, or that the data come from an expected image sensor. The kind of additional data that is initially provided 801 is adapted for the analysis that is to be performed. If the analysis is adapted for verifying that the active image sensor data are not too old, for example to verify that a supposed live view is in fact live and not delayed to an extent that the view cannot be used for making crucial decisions, the additional data may be in the form of a time stamp provided 801 at the time of acquiring the image sensor frame that comprised the active image sensor data in question. At the display device, the time stamp may be analysed by comparing it to a current time (originating from the same time provider, e.g., a local or global clock, as the time stamp), and if it differs more than a predetermined threshold, take 808 an action to warn or inform a user of the condition. Alternatively, the additional data may be in the form of a position provided at the time of acquiring the image sensor frame. In such an embodiment, the display device may analyse the additional data by comparing the position therein with a current position that may be received or requested from an external data provider. If a distance between the compared positions exceeds a predetermined threshold, an action to warn of inform a user of the condition may be taken.

In another embodiment, the additional data may indicate a serial number of the image sensor. The display device may analyse the additional data by comparing the serial number to a serial number of an image sensor that is expected to have acquired the image data to verify the authenticity of the received modified active image sensor data. This embodiment may be translated to similar embodiments with additional data representing static (non-changing) information for verifying the active image sensor data. additional data deviates from what is expected, an alarm action may be triggered to warn the user of the deviation.

In all of the above disclosed examples, the additional data may be provided by the external data provider 16 to the image sensor device 10, to the image processor 12, and/or to the controller 14, as indicated by 106. In some embodiment, the additional data is also communicated to a device, such as the display device discussed above, for evaluating received modified active image sensor data. Hence, the additional data are provided in different devices depending on application. The external data provider 16 is adapted to provide the additional data that is required by the specific implementation. For providing additional data in the form of a time stamp, the external data provider 16 may be a clock device. For providing additional data in the form of a position, the external data provider 16 may be a GNSS device. For providing static information, the external data provider 16 may comprise a database and processing capabilities for providing the additional data. The additional data may be provided upon initiation by the external data provider 16, or upon receiving a request at the external data provider 16 from the image sensor device 10, the image processor 12, or the controller 14. An alternative to an external data provider 16 is a data provider (not illustrated) that is comprised in the image sensor device 10, the image processor 12, or the controller 14.

Figure 7:
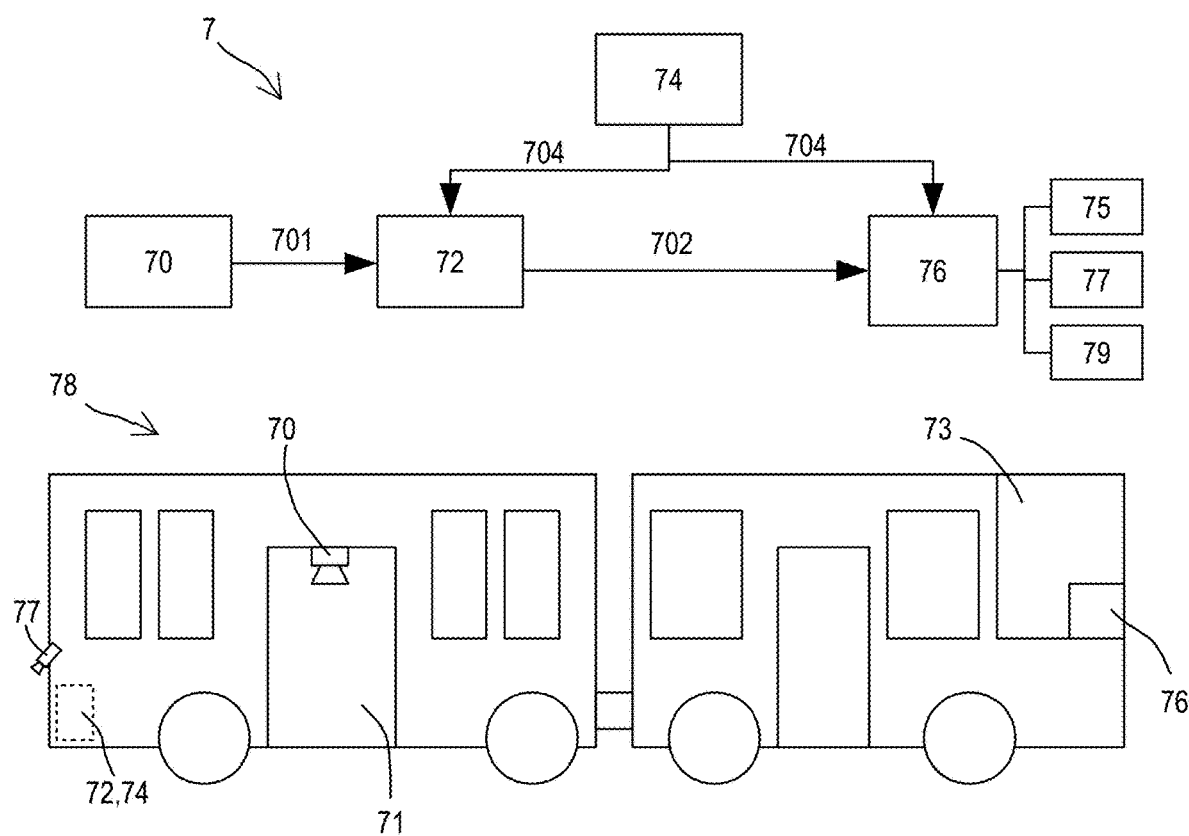
FIG. 7 illustrates a system according to an embodiment implemented in a bus.

A specific embodiment will now be disclosed with reference to FIG. 7 which illustrates a camera-based support system 7 for a bus driver, specifically for situations of closing a bus door 71 of a bus 78. This scenario represents one of various scenarios where it is important for security reasons to verify that a live view is in fact live in the sense that each image is displayed within a predetermined and acceptable maximum delay period. Camera based support systems for vehicle drivers are becoming more common, including door cameras for buses and rear camera in cars. It is crucial for the security that a driver can trust displayed images from the camera to be able to take decision on actions that do not risk injuring other people. In the embodiment illustrated in FIG. 7, the bus driver located in a driver's seat 73 uses the support system 7 for determining when an area around the bus door 71 is clear from people and obstacles, and the bus door 71 can be closed without injuring someone or causing other damage.

According to the embodiment, a camera device including an image sensor device 70 is located at the bus door 71, and adapted to acquire images of the bus door area. The camera device is connected to an image processing device 72 that comprises an image processor and an encoder. From a clock device 74, a time signal can be provided to the image processing device 72, as indicated by 704. The clock device 74 may be local or global. The connections within devices of the system 7 may be wired or wireless, in accordance to conventional data communication structures.

In accordance with the inventive concept, additional data in the form of a time stamp are acquired by the time signal from the clock device 74. The time stamp is acquired to correspond to the time of acquiring image sensor frames. The additional data (comprising the time stamp) are injected into one or more image sensor frames and transmitted (indicated by 701) from the image sensor device 70 to the image processing device 72. The additional data are received and included in active image sensor data by modifying the active image sensor data. The modified active image sensor data are transmitted, after encoding, from the image processing device 72 to a display device 76, as indicated by 702. The display device 76 comprises a decoder. After decoding, the additional data are analysed, optionally in parallel with being displayed on a display 75 for being viewed by the driver. The display device 76 is aware of how the additional data are included into the modified active image sensor data, and has the capability to interpret the included data. This knowledge may be provided by the image processing device 72 to the display device 76, possibly when the modified active image sensor data are transmitted (as indicated by 702) to the display device 76 or even as information being part of the modified active image sensor data.

In this embodiment, the time stamp of the additional data is compared to a current time stamp that is received (optionally upon request) from the clock device 74. Upon a difference between the time of the additional data and the current time exceeding a predetermined threshold, the display device 76 triggers an alarm action for indicating to the driver that the received modified active image sensor data are old. By old is meant exceeding a predetermined age, which in this embodiment can be in the order of tenths of a second, or around a second. The alarm action may comprise one or a combination of the following non-limiting examples of actions:

refraining from displaying an image of the modified active image sensor data, cancelling display of an image of the modified active image sensor data, displaying the received modified image sensor data in a flashing manner, or with an overlay of a particular color, for example a semi-transparent red overlay, displaying an indication on the display 75 indicating that the images of the modified active image sensor data are currently not live, playing a sound by a speaker 77 connected to the display device 76, activating an illuminator 79 connected to the display device 73.

Hence, the driver of the bus 78 is provided with a support system 7 that increases the security and provides a more reliable system for taking critical decisions. The system 7 may in other embodiments include more than one image sensor device, such as a rear camera 77 comprising an image sensor device. In such a system, the display device 73 may receive and verify image sensor data from different image sensor device sources for displaying to the driver, for example as multiple views on the display 75.

Although the illustrated embodiment shows a display device 76, this should not be interpreted as limiting the present invention. Other embodiments include an evaluating device without a display, wherein the evaluating device is adapted to analyse the additional data to device whether the associated image sensor data are valid or not. Hence, a display is not necessary in order to perform such an evaluation. In one embodiment, where the additional data is sent from the processing or storage device as metadata, the evaluating device needs to receive only the metadata in order to perform the evaluation. Hence, the active image sensor data may be excluded or sent to another device (such as a display device) for display. The evaluating device may thus be a separate device from a display device.

The general structure of the system 7, or other embodiments of the present invention, may be transformed into other systems for scenarios with similar security challenges. Based on the description herein, and general knowledge, the skilled person is able to achieve such transformations.

Non-limiting examples of applications for which the present invention may be beneficial include:
- telemedical applications
- remote medical treatment/surgery/examinations
- transportation applications, for example remote control of bridges or remote control of air tower functions
- remote technical assistance and technical services, for example remote assistance for maintenance of technical equipment
- verification of image documentation, for example by verifying that images are taken of a presumed object by studying a position coordinate in the additional information
- medical examinations, such as gastroscopy or colonoscopy In the above the inventive concept has mainly been described with reference to a limited number of examples. However, as is readily appreciated by a person skilled in the art, other examples than the ones disclosed above are equally possible within the scope of the inventive concept, as defined by the appended claims.

The invention claimed is:

1. A method, comprising:
   providing additional data in a form of a numeric sequence,
   controlling, using processing circuitry, lengths of subsequent blanking intervals in one or more image sensor frames in an image sensor device to represent the numeric sequence, wherein the numeric sequence representing the additional data is identifiable using the lengths of the subsequent blanking intervals, and
   transmitting the one or more image sensor frames from the image sensor device.

2. The method according to claim 1, further comprising:
   receiving the transmitted one or more image sensor frames while determining the lengths of the subsequent blanking intervals to identify the numeric sequence which represents the additional data, and
   modifying active image sensor data in the received one or more image sensor frames to include the additional data.

3. The method according to claim 2, wherein the receiving and the modifying are performed by an image processor.

4. The method according to claim 2, further comprising, before the modifying, transforming the numeric sequence to a format associated with the type of additional data.

5. The method according to claim 2, wherein the modifying comprises including the additional data as an overlay or as an embedded signal.

6. The method according to claim 1, wherein the additional data indicates a current condition for a point in time when the one or more image sensor frames are acquired.

7. The method according to claim 6, wherein the additional data indicates a time, a date, or a position.

8. The method according to claim 1, wherein the additional data are provided in an image processor, and wherein the lengths of subsequent blanking intervals are controlled by the image processor.

9. The method according to claim 1, wherein the numeric sequence is a binary sequence.

10. The method according to claim 1, further comprising controlling lengths of one or more blanking intervals, other than the subsequent blanking intervals, for compensation, such that transmissions of image sensor frames take the same amount of clock cycles.

11. An image processor, comprising:
    processing circuitry configured to
        provide additional data in a form of a numeric sequence, and
        control lengths of subsequent blanking intervals in one or more image sensor frames in an image sensor device to represent the numeric sequence, wherein the numeric sequence representing the additional data is identifiable using the lengths of the subsequent blanking intervals.

12. The image processor according to claim 11, wherein the processing circuitry is configured to:
    receive, from the image sensor device, the one or more image sensor frames while determining the lengths of the subsequent blanking intervals to identify the numeric sequence which represents the additional data, and
    modify active image sensor data in the received one or more image sensor frames to include the additional data.

13. A system comprising an image sensor device and an image processor according to claim 11.

14. The system according to claim 13, further comprising an evaluating device,
    wherein the processing circuitry is configured to transmit the modified active image sensor data to the evaluating device, and wherein the included additional data are in the form of a time or a position for when the one or more image sensor frames were acquired,
    wherein the evaluating device is configured to determine if the time or the position of the additional data differs from a current time or current position more than a predetermined threshold, and, if so, trigger an alarm action to indicate to a user that the received modified active image sensor data are old.

15. The system according to claim 14, wherein alarm action is triggered by triggering one or more of following actions: refraining from or cancelling display of the received modified active image sensor data on a display, displaying the received modified active image sensor data in a flashing manner on a display, displaying an indication on a display, activating an illuminator, and playing a sound by a speaker.

* * * * *